United States Patent
Wang et al.

(10) Patent No.: US 12,021,746 B2
(45) Date of Patent: Jun. 25, 2024

(54) INTER-WORKING OF A SOFTWARE-DEFINED WIDE-AREA NETWORK (SD-WAN) DOMAIN AND A SEGMENT ROUTING (SR) DOMAIN

(71) Applicant: Cisco Technology, Inc., San Jose, CA (US)

(72) Inventors: Lianxiang Wang, Shanghai (CN); Zhiyong Fang, Chongqing (CN); Xiaorong Wang, Shanghai (CN); Bin Shi, Shanghai (CN); Jianda Liu, Shanghai (CN); Yunpeng Zhang, Shanghai (CN)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 17/674,453

(22) Filed: Feb. 17, 2022

(65) Prior Publication Data
US 2023/0261989 A1  Aug. 17, 2023

(51) Int. Cl.
*H04L 45/586* (2022.01)
*H04L 45/42* (2022.01)
*H04L 45/50* (2022.01)
*H04L 45/745* (2022.01)

(52) U.S. Cl.
CPC ............ *H04L 45/586* (2013.01); *H04L 45/42* (2013.01); *H04L 45/507* (2013.01); *H04L 45/745* (2013.01)

(58) Field of Classification Search
CPC ..... H04L 45/586; H04L 45/42; H04L 45/507; H04L 45/745
See application file for complete search history.

(56) References Cited

U.S. PATENT DOCUMENTS

| 2016/0380886 A1* | 12/2016 | Blair | H04J 14/0278 |
| | | | 370/254 |
| 2018/0109493 A1* | 4/2018 | Khan | H04L 63/0209 |
| 2019/0058657 A1* | 2/2019 | Chunduri | H04L 45/50 |
| 2019/0379601 A1* | 12/2019 | Khan | H04L 45/507 |
| 2020/0137174 A1* | 4/2020 | Stammers | H04L 67/51 |
| 2020/0177550 A1* | 6/2020 | Valluri | H04L 63/0236 |

(Continued)

FOREIGN PATENT DOCUMENTS

CN    110611616 A    12/2019

*Primary Examiner* — William G Trost, IV
*Assistant Examiner* — Monishwar Mohan
(74) *Attorney, Agent, or Firm* — Baker Botts L.L.P.

(57) ABSTRACT

According to an embodiment, a node comprises one or more processors operable to execute instructions to cause the node to perform operations that comprise receiving a packet from a first node associated with an SD-WAN domain. The packet comprises a header indicating a TLOC associated with a second node to send the packet, the second node associated with an SR domain. The operations comprise determining that the TLOC corresponds to a virtual TLOC used in the SD-WAN domain to identify the second node that is in the SR domain and, in response, determining a second node identifier used in the SR domain to identify the second node. The operations further comprise preparing the packet to be communicated via the SR domain. Preparing the packet comprises including the second node identifier in the packet. The operations further comprise sending the packet comprising the second node identifier to the second node.

16 Claims, 4 Drawing Sheets

(56) References Cited

U.S. PATENT DOCUMENTS

| | | |
|---|---|---|
| 2021/0036987 A1* | 2/2021 | Mishra ................ H04L 61/2592 |
| 2021/0067464 A1* | 3/2021 | Cidon .................. H04L 41/122 |
| 2021/0160179 A1 | 5/2021 | Sundararajan et al. |
| 2022/0141117 A1* | 5/2022 | Zhao ..................... H04L 45/507 |
| | | 370/252 |

* cited by examiner

INTER-WORKING OF A SOFTWARE-DEFINED WIDE-AREA NETWORK (SD-WAN) DOMAIN AND A SEGMENT ROUTING (SR) DOMAIN

TECHNICAL FIELD

Certain embodiments relate, in general, to inter-working of an SD-WAN domain and an SR domain.

BACKGROUND

A traditional wide-area network (WAN) function was to connect users at an enterprise or branch location to applications hosted on servers in a data center. The traditional WAN typically used dedicated circuits to connect the enterprise or branch to the data center. Software-defined WAN (SD-WAN) introduces a software-defined approach to managing the WAN. Certain SD-WAN deployments may deliver routing, threat protection, efficient offloading of expensive circuits, and simplification of WAN network management. As an example, the SD-WAN may be well-suited to support cloud-based applications that are accessible to a large number of users distributed across the globe.

Segment routing (SR) is a routing technique that may simplify traffic management across network domains. Components of an SR architecture may include an SR domain, an SR path, and an SR segment. The SR domain comprise nodes that participate in SR protocols. Within an SR domain, a node can provide ingress, transit, or egress functionality. The SR path comprises segments that connect an SR ingress node to an SR egress node. The SR segment facilitates communicating a packet over a section of the network. For example, an SR ingress node may place path state information into a header of a packet and may send the packet to traverse an SR path, segment by segment. A segment in an SR path may terminate at a segment endpoint node. When the packet arrives at the segment endpoint, the endpoint may remove the outermost label or header and forward the packet to the next segment endpoint. This process continues until the packet arrives at the final segment endpoint, which may be the SR egress node. The SR egress node may remove the SR header information and forward the packet based on its destination IP address.

DESCRIPTION OF EXAMPLE EMBODIMENTS

Overview

Figure 1:
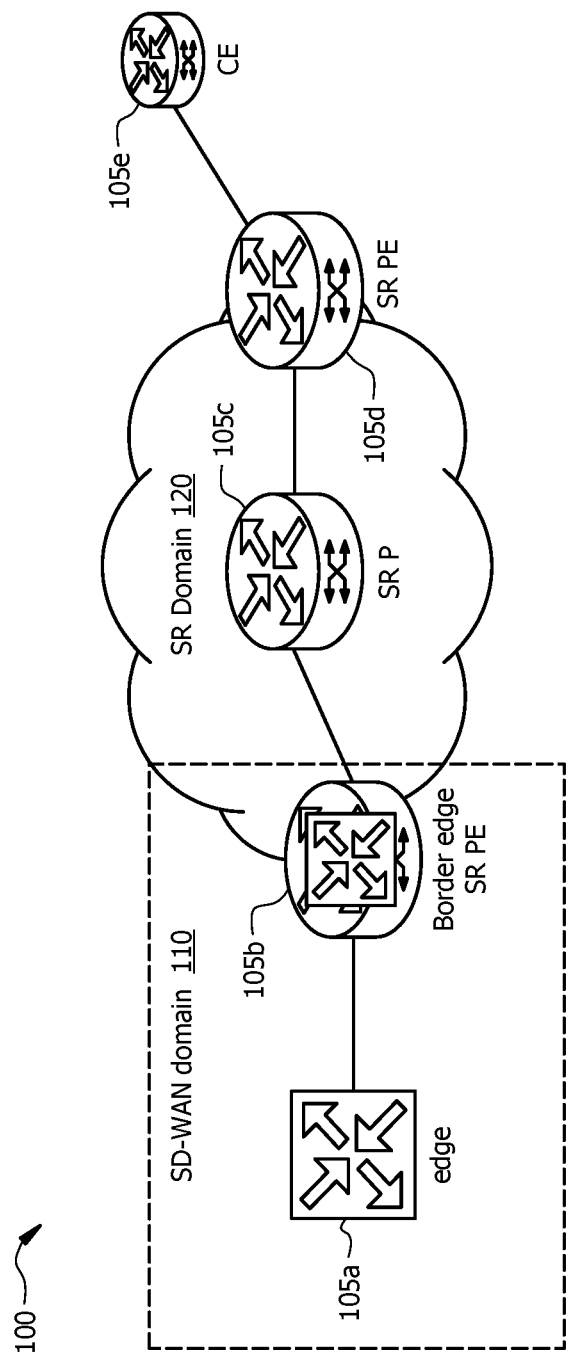
FIG. 1 illustrates an example of inter-working an SD-WAN domain and an SR domain, in accordance with certain embodiments.

According to an embodiment, a node comprises one or more processors and one or more computer-readable non-transitory storage media comprising instructions that, when executed by the one or more processors, cause one or more components of the node to perform operations. The operations comprise receiving a packet from a first node associated with an SD-WAN domain. The packet comprises a header indicating a TLOC associated with a second node to which to send the packet, the second node associated with an SR domain. The operations comprise determining that the TLOC corresponds to a virtual TLOC used in the SD-WAN domain to identify the second node that is in the SR domain and, in response, determining a second node identifier used in the SR domain to identify the second node. The operations further comprise preparing the packet to be communicated via the SR domain. Preparing the packet comprises including the second node identifier in the packet. The operations further comprise sending the packet comprising the second node identifier to the second node.

According to another embodiment, a method performed by a node comprises receiving a packet from a first node associated with an SD-WAN domain. The packet comprises a header indicating a TLOC associated with a second node to which to send the packet, the second node associated with an SR domain. The method comprises determining that the TLOC corresponds to a virtual TLOC used in the SD-WAN domain to identify the second node that is in the SR domain and, in response, determining a second node identifier used in the SR domain to identify the second node. The method further comprises preparing the packet to be communicated via the SR domain. Preparing the packet comprises including the second node identifier in the packet. The method further comprises sending the packet comprising the second node identifier to the second node.

According to yet another embodiment, one or more computer-readable non-transitory storage media may embody instructions that, when executed by a processor of a node, cause the performance of operations. The operations comprise receiving a packet from a first node associated with an SD-WAN domain. The packet comprises a header indicating a TLOC associated with a second node to which to send the packet, the second node associated with an SR domain. The operations comprise determining that the TLOC corresponds to a virtual TLOC used in the SD-WAN domain to identify the second node that is in the SR domain and, in response, determining a second node identifier used in the SR domain to identify the second node. The operations further comprise preparing the packet to be communicated via the SR domain. Preparing the packet comprises including the second node identifier in the packet. The operations further comprise sending the packet comprising the second node identifier to the second node.

Technical advantages of certain embodiments of this disclosure may include one or more of the following. Certain embodiments may facilitate inter-working of an SD-WAN domain and an SR domain. Certain embodiments may facilitate end-to-end path control for deployments where one end of the path corresponds to the SD-WAN domain and the other end of the path corresponds to the SR domain. As an example, certain embodiments may associate a virtual transport locator (TLOC) with a node in the SR domain. A node in the SD-WAN domain may use the virtual TLOC to facilitate communication with the node in the SR domain. Other technical advantages will be readily apparent to one skilled in the art from the following figures, descriptions, and claims. Moreover, while specific advantages have been enumerated above, various embodiments may include all, some, or none of the enumerated advantages.

Example Embodiments

FIG. 1 illustrates an example of a network 100 inter-working an SD-WAN domain 110 and an SR domain 120, in accordance with certain embodiments. Network 100 comprises a plurality of nodes 105, such as nodes 105a-105e shown in FIG. 1. For purpose of example, FIG. 1 illustrates node 105a as an edge associated with the SD-WAN domain 110. FIG. 1 illustrates node 105b as a border edge device at the border of the SD-WAN domain 110 and the SR domain 120. In particular, FIG. 1 illustrates node 105b as a segment routing provider edge (SR PE) device. FIG. 1 illustrates node 105c within the SR domain 120 (e.g., within the SR core). In particular, FIG. 1 illustrates node 105c as a segment routing provider (SR P) device. FIG. 1 illustrates node 105d at the remote edge of the SR domain 120. In particular, FIG. 1 illustrates node 105d as an SR PE device. FIG. 1 illustrates node 105e as a customer edge (CE) device. As an example, traffic from node 105a may traverse nodes 105b, 105c, and 105d in order to reach node 105e, and vice versa.

In general, SD-WAN technology provides enterprise WAN optimization and SR provides service provider (SP) core network technology. Recently, more and more deployments combine SD-WAN and SR, as shown in FIG. 1. If the traffic is from an edge router in the SD-WAN domain 110 (e.g., node 105a) to a remote edge of the SR domain 120 (e.g., to SR PE node 105d or CE node 105e), existing technology redistributes the remote SR's virtual private network (VPN) route to overlay management protocol (OMP) vpn route in border edge node 105b, then redistributes to the SD-WAN domain 110's edge routers (e.g., edge node 105a). Then traffic comes to border edge node 105b through an SD-WAN session, then does another destination lookup to go to the remote edge of the SR domain 120 (e.g., to SR PE node 105d or CE node 105e) through the SR path. A limitation of this approach is that it cannot do end-to-end path control. That is, the existing approach cannot find out a best path from a source SD-WAN edge node 105 to remote node (e.g., SR PE node 105d or CE node 105e).

Previous approaches focus on SD-WAN domain 110 over SR domain 120 deployments where the local domain and remote domain are both associated with an SD-WAN domain 110, and where the SR domain 120 is between the two SD-WAN domains 110. These previous approaches rely on an SD-WAN session from the local edge to the remote edge to achieve end-to-end control. However, there is no existing method to form an end-to-end SD-WAN session or to achieve end-to-end control for deployments where the remote domain is not an SD-WAN domain 110. Certain embodiments of the present disclosure provide a solution to facilitate end-to-end control for deployments where the local domain is an SD-WAN domain 110 and the remote domain is not an SD-WAN domain 110. Certain embodiments leverage an SD-WAN session to achieve end-to-end path selection.

To summarize, existing approaches focus on the deployment of SD-WAN over SR, where both ends are SD-WAN edges and between them there is an SR core. Existing approaches of using SD-WAN to compute a path across an SR core require both of the edges to be in the SD-WAN domain 110 and further require both of the edges to communicate with SD-WAN control to form SD-WAN sessions. In these existing approaches, the SR domain 120 simply provides a path between two SD-WAN domains 110. By contrast, the present disclosure supports the case of the SD-WAN domain 110 inter-working with the SR domain 120. That is, certain embodiments of the present disclosure achieve end-to-end control in deployments where one side is the SD-WAN domain 110 and another side is the SR domain 120. Certain embodiments of the present disclosure provide a solution to the problem that, there is no existing way to form an end-to-end SD-WAN session if the remote domain is not in an SD-WAN domain and the remote domain is not controlled by the SD-WAN controller. Certain embodiments achieve end-to-end control for deployments where the local domain is an SD-WAN domain 110 and the remote domain is an SR domain 120 (not an SD-WAN domain 110).

Figure 2:
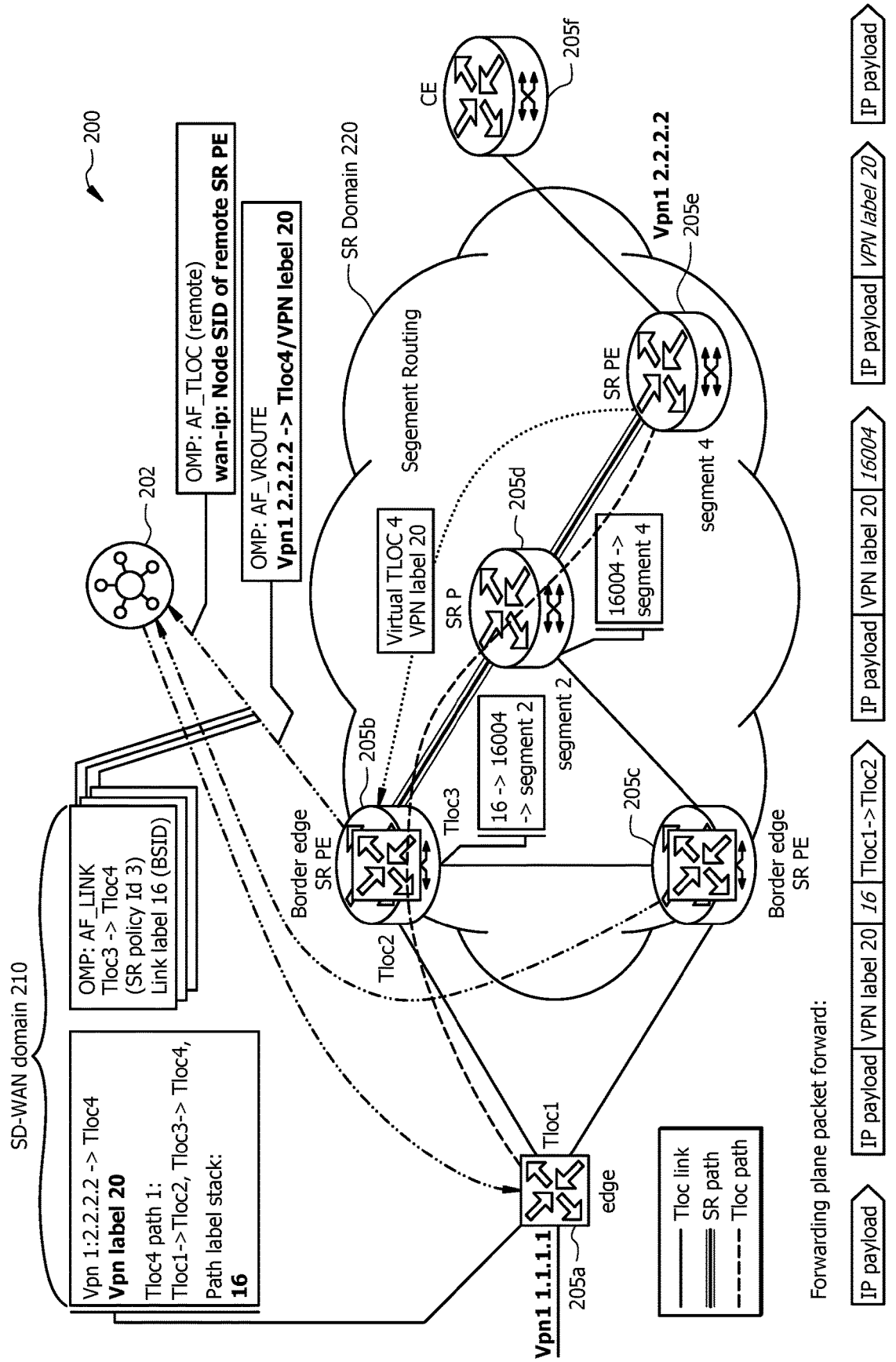
FIG. 2 illustrates an example of inter-working an SD-WAN domain and an SR domain, in accordance with certain embodiments.

FIG. 2 illustrates another example of a network 200 inter-working an SD-WAN domain 210 and an SR domain 220, in accordance with certain embodiments. Network 200 comprises a controller 202 and a plurality of nodes 205, such as nodes 205a-205f shown in FIG. 2. In certain embodiments, controller 202 provides control for the SD-WAN domain. Examples of control provided by controller 202 may include controlling the flow of traffic to, from, and/or through the SD-WAN domain, facilitating connectivity to or among nodes 205 (e.g., edge devices) of the SD-WAN domain, managing provisioning, maintenance, and/or security for the SD-WAN domain, etc. In one embodiment, controller 202 may be a Cisco vSmart controller.

For purpose of example, FIG. 2 illustrates node 205a as an edge device associated with the SD-WAN domain 210. FIG. 2 illustrates nodes 205b and 205c as border edge devices (SR PEs) at the border of the SD-WAN domain 210 and the SR domain 220. FIG. 2 illustrates node 205d within the SR domain 220 (e.g., as an SR P within the SR core). FIG. 2 illustrates node 205e as an SR PE at the remote edge of the SR domain 220. FIG. 2 illustrates node 205f as a CE device.

Certain embodiments of the present disclosure leverage an SD-WAN overlay management protocol (OMP) route redistribution mechanism and create a virtual remote Transport Locator (TLOC) in a border edge (e.g., node 205b) to achieve end-to-end path control. As an example, certain embodiments include the following steps:

Step 1: remote SR PE (e.g., node 205e) advertises its VPN route using an SR routing protocol, such as Multiprotocol Internal Border Gateway Protocol (MP-iBGP) VPNv4 protocol. This VPN route will have a VPN label and its nexthop is its border gateway protocol (BGP) source interface IP, normally the PE's loopback address. This nexthop is reached through an SR path from the SD-WAN border edge (e.g., node 205b).

Step 2: in the SD-WAN border edge (e.g., node 205b), certain embodiments get the VPN route's VPN label and nexthop information. When redistributing this VPN route into OMP, the SD-WAN border edge (e.g., node 205b) generates a virtual remote TLOC. This virtual remote TLOC's system-ip and WAN public ip is the route's nexthop. This virtual TLOC is then published through OMP's OMP_AF_TLOC address family to other edge devices. The SD-WAN border edge (e.g., node 205b) also publishes the VPN route through OMP_AF_VROUTE address family to other SD-WAN edge devices with VPN label and nexthop TLOC. The VPN label is received from the remote SR PE (e.g., node 205e), not the SD-WAN border edge's (e.g. node 205b's) VPN label. The nexthop is virtual remote TLOC, not SD-WAN border edge local TLOC. This is different from existing OMP redistribution mechanisms.

Step 3: meanwhile, the SD-WAN border edge (e.g., node 205b) may have multiple SR path defined by SR policy profiles to the remote SR PE (e.g., node 205e). Each SR path will have a binding segment identifier (SID) label. The SD-WAN border edge (e.g., node 205b) publishes these SR path through OMP protocol OMP_AF_LINK and its Binding SID label as the link label. The link (actually the SR path) and link label (actually the Binding SID label) will be received by other SD-WAN edge devices.

Step 4: the source SD-WAN edge device (e.g., node 205a) can calculate an optimal path according to the SD-WAN Bidirectional Forwarding Detection (BFD) metric and the SR path's metric and select the path according to configured policy. When traffic is sent to this selected path, the VPN label and link label (actually SR path's Binding SID label) is carried in the packet.

Step 5: when the packet reaches an SD-WAN border edge (e.g., node 205b), the Binding SID label is swapped to an SR path label stack and steered in the SR domain core network.

Step 6: when the packet reaches the remote SR PE (e.g., node 205e) and the SR transport label stack is popped, the inner VPN label is recognized by the SR PE because it is published by this SR PE at the beginning (step 1).

In the example of FIG. 2, a first TLOC link connects TLOC1 associated with edge node 205a and TLOC2 associated with a first interface of border edge SR PE 205b. A second TLOC link connects TLOC3 associated with a second interface of border edge SR PE 205b and virtual TLOC4 associated with SR PE 205e in the SR domain 220. In certain embodiments, the virtual TLOC4 may be associated with the SR PE node 205e's VPN (e.g., Vpn1 2.2.2.2) and VPN label (e.g., Vpn label 20). The first TLOC link and the second TLOC link form a TLOC path comprising TLOC1→TLOC2→TLOC3→TLOC4. An SR path connects border edge SR PE node 205b and SR PE node 205e via SR P node 205d.

Certain embodiments may be adapted to consider migration and co-existence with legacy edge devices. As an example, in the migration case, some CE devices are old images and would not be able to reach a virtual remote TLOC because the old images do not support the concept of a TLOC path and an SR link. To address this, the border edge (e.g., node 205b) may publish the redistributed VPN route with the nexthop of local TLOC and local VPN label through OMP protocol. The other edge devices (e.g., nodes 205a and 205c) will receive the remote SR PE's (e.g., node 205e's) VPN route with two kinds of nexthop: one is SD-WAN local border edge node 205b's local TLOC and local VPN label, and the other is SD-WAN local border edge node 205b's virtual remote TLOC and VPN label that is from the remote SR PE node 205e. Old images that cannot reach the virtual remote TLOC will reject the second VPN route entry and only set up the first VPN route entry and forward traffic like before. New images that can reach both the virtual remote TLOC and SD-WAN border edge 205b's local TLOC will set up both VPN route entry and select one, for example, according to a control policy or a central policy.

Certain embodiments provide a solution of end-to-end path control when inter-working an SD-WAN domain 210 with an SR domain 220. First, certain embodiments introduce the concept of a virtual TLOC. The virtual TLOC may be created in the SD-WAN border edge router (e.g., node 205b). The virtual TLOC is created to facilitate including a remote node (e.g., SR PE node 205e) in a TLOC path. The virtual TLOC's system-ip/WAN ip is from the remote node (e.g., the SR's remote PE). Second, in certain embodiments, the SD-WAN border edge router (e.g., node 205b) publishes the virtual TLOC to other edge routers as normal remote TLOC, so other edge routers will treat SR domain's remote PE router (e.g., node 205e) as a remote SD-WAN edge router. In this manner, the remote SR PE node 205e looks like a remote SD-WAN edge router from the perspective of the local SD-WAN domain 210, even though the remote SR PE node 205 is actually in the SR domain 220 (not an SD-WAN domain 210). In certain embodiments, the SD-WAN border edge router (e.g., node 205b) communicates with controller 202 to facilitate publishing the virtual TLOC to the other edge routers (e.g., node 205a and/or node 205c associated with the local SD-WAN domain 210). Third, in certain embodiments, the SD-WAN border edge router (e.g., node 205b) also publishes the VPN route and VPN label received from SR domain's remote PE (e.g., node 205e) along with the virtual TLOC. Fourth, certain embodiments leverage existing SD-WAN OMP_AF_LINK so that SD-WAN interworking with SR deployment becomes the multiple hop SD-WAN over SR deployment to achieve end-to-end control. With this solution, service traffic from SD-WAN source edge (e.g., node 205a) to SR domain's PE or CE (e.g., node 205e or node 205f) can be steer to the path across SD-WAN overlay and SR core network without a second destination lookup in the SD-WAN border edge (e.g., node 205b).

Figure 3A:
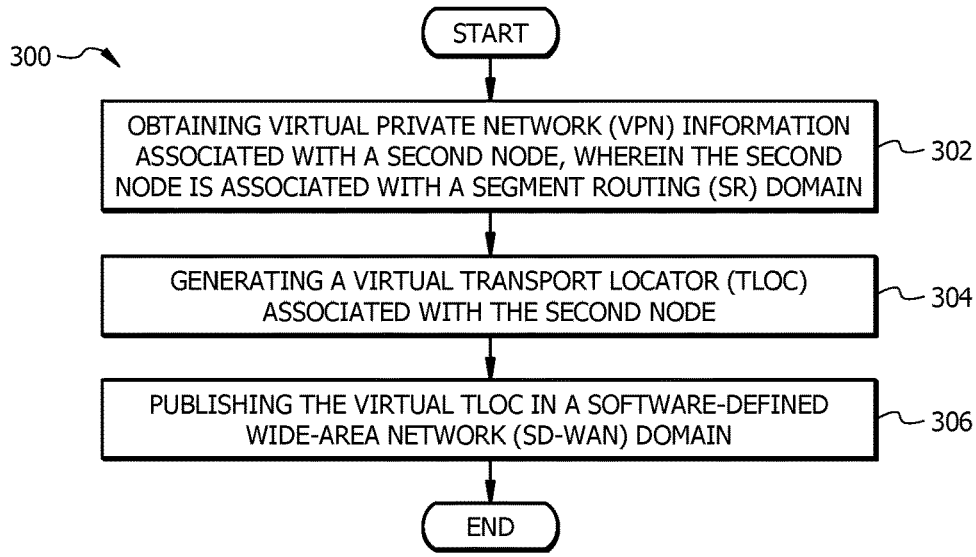
FIGS. 3A and 3B illustrate example flow charts of methods that may be performed by a node, in accordance with certain embodiments.
Figure 3B:
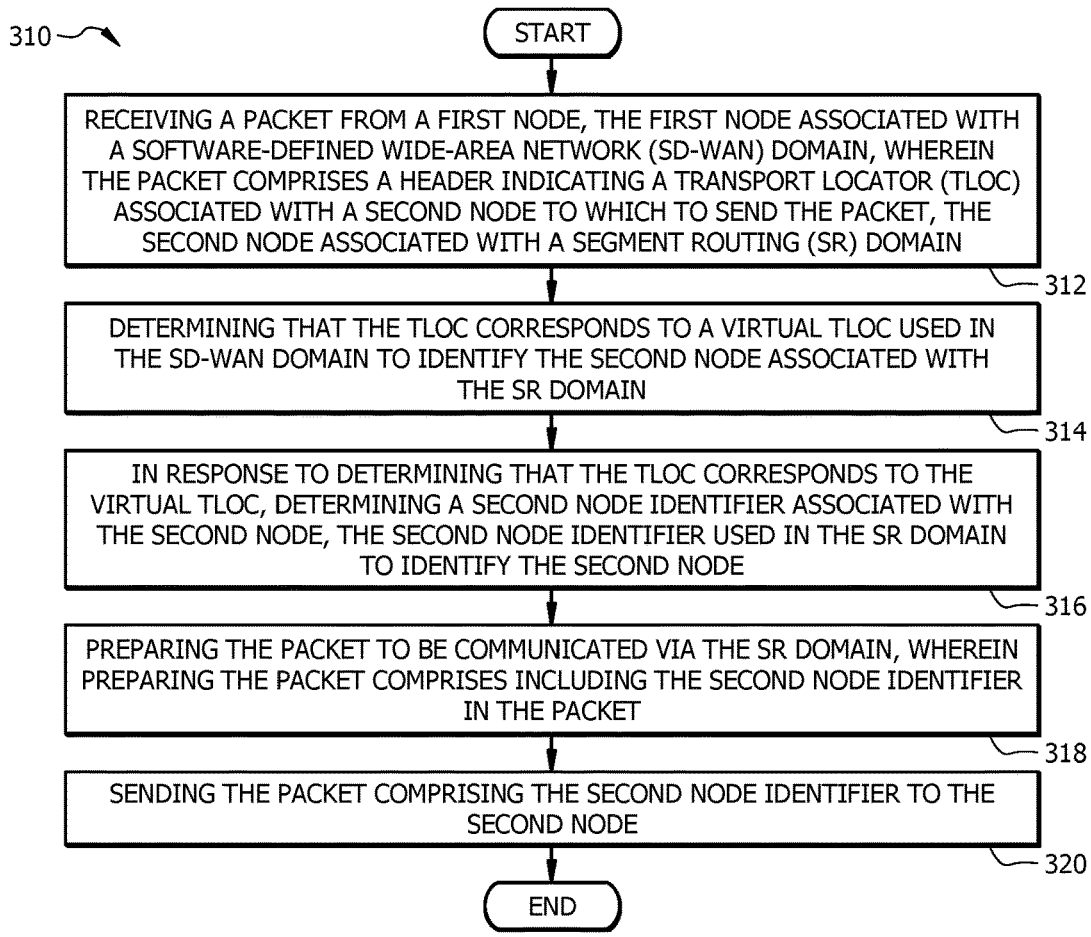

FIGS. 3A and 3B illustrate example flow charts of methods 300 and 310 that may be performed by anode, in accordance with certain embodiments. As an example, method 300 of FIG. 3A and/or method 310 of FIG. 3B may be performed by a node 105 of FIG. 1 or a node 205 of FIG. 2. In certain embodiments, a node may comprise one or more processors (such as processor 402 described below with respect to FIG. 4) and one or more computer-readable non-transitory storage media (such as memory 404 and/or storage 406 described below with respect to FIG. 4). The one or more computer-readable non-transitory storage media comprise instructions that, when executed by the one or more processors, cause one or more components of the node to perform method 300 and/or method 310.

In certain embodiments, a node may perform method 300 of FIG. 3A followed by method 310 of FIG. 3B. For example, method 300 may be used to generate a virtual TLOC for a remote node associated with an SR domain and to distribute the virtual TLOC in an SD-WAN domain. Once the virtual TLOC has been generated and distributed, the SD-WAN domain can use the virtual TLOC, for example, in accordance with method 310. In certain embodiments, method 300 and/or method 310 may be performed by a border edge node that facilitates communication of packets between a first node associated with an SD-WAN domain, such as SD-WAN domain 110 or 210, and a second node associated with an SR domain, such as SR domain 120 or 220. The second node may be external to the SD-WAN domain of the first node and any other SD-WAN domain. As an example, method 300 and/or method 310 may be performed by border edge node 105b of FIG. 1 or border edge node 205b or 205c of FIG. 2. The first node may be a source edge, such as edge node 105a of FIG. 1 or edge node 205a of FIG. 2. The second node may be a remote node, such as SR PE node 105d or CE node 105e of FIG. 1 or SR PE node 205e or CE node 205f of FIG. 2.

In certain embodiments, method 300 of FIG. 3A begins at step 302 with obtaining VPN information associated with the second node. The second node is associated with an SR domain. The second node may be external to any SD-WAN domain. Certain embodiments obtain the VPN information from the SR domain according to a BGP (border gateway protocol), such as MP-iBGP VPNv4 protocol as one example. Examples of VPN information may include a VPN address and a VPN label, such as VPN1 address 2.2.2.2 and VPN label 20 shown in FIG. 2.

At step 304, method 300 generates a virtual TLOC associated with the second node. As an example, method 300 may generate the virtual TLOC to provide with the VPN information when redistributing the VPN information in an SD-WAN domain. The virtual TLOC may be used in the SD-WAN domain to identify the second node associated with the SR domain. The virtual TLOC facilitates end-to-end control of the packet from the SD-WAN domain to the SR domain.

In certain embodiments, the virtual TLOC indicates a System-IP and the System-IP is based on an IP address of the second node. In certain embodiments, the virtual TLOC further indicates a transport color. The transport color may be used to differentiate different transports, such as multi-protocol label switching (MPLS), Internet, long term evolution (LTE), etc. In cases where transport types are the same but should still be treated differently from each other (such as two different Internet providers) different transport colors can be used. In certain embodiments, the transport color information includes details needed for data plane tunnel setup, such as interface IPs, ports, fabric information, and/or other suitable information. In certain embodiments, the virtual TLOC indicates an encapsulation type. The encapsulation type may be used for advertising of data plane connectivity. Examples of encapsulation types include Internet Protocol Security (IPSec) and Generic Routing Encapsulation (GRE).

At step 306, method 300 publishes the virtual TLOC associated with the second node in the SD-WAN domain. In certain embodiments, publishing the virtual TLOC in the SD-WAN domain comprises communicating the virtual TLOC to a controller associated with the SD-WAN domain, such as controller 202 of FIG. 2. The controller is configured to distribute the virtual TLOC to a plurality of nodes of the SD-WAN domain, the plurality of nodes comprising the first node. Referring to FIG. 2 as an example, controller 202 may receive the virtual TLOC from border edge node 205*b* and may distribute the virtual TLOC to edge node 205*a* and/or border edge node 205*c*. In certain embodiments, publishing the virtual TLOC in the SD-WAN is according to an OMP (overlay management protocol). In certain embodiments, method 300 distributes the virtual TLOC in the SD-WAN with the VPN information (e.g., VPN address and/or VPN label) received in step 302.

Turning now to FIG. 3B. As described above, FIG. 3B illustrates an example method 310. In certain embodiments, method 310 begins with receiving a packet at step 312. The first node is associated with an SD-WAN domain. The packet comprises a header indicating a TLOC associated with a second node to which to send the packet. The second node is associated with an SR domain. The second node may be external to the SD-WAN domain of the first node and any other SD-WAN domain. As an example, the packet may be received from a first node (e.g., edge node 105*a* or edge node 205*a*) by a border edge node (e.g., border edge node 105*b*, 205*b*, or 205*c*), and the packet may comprise a header indicating a TLOC associated with a second node (e.g., SR PE node 105*d*, CE node 105*e*, SR PE node 205*e*, or CE node 205*f*).

At step 314, method 310 determines that the TLOC indicated in the header of the packet received in step 312 corresponds to a virtual TLOC used in the SD-WAN domain to identify the second node associated with the SR domain. As an example, method 310 may determine that the TLOC is a virtual TLOC based on an attribute of the TLOC; based on identifying the TLOC in a table or list of virtual TLOCs; based on the second node being associated with the SR domain; and/or based on other suitable information or technique.

At step 316, in response to determining that the TLOC corresponds to the virtual TLOC, method 310 determines a second node identifier associated with the second node. The second node identifier is used in the SR domain to identify the second node. As an example, in certain embodiments, the second node identifier used in the SR domain to identify the second node comprises the VPN information described above (e.g., VPN address and/or VPN label).

At step 318, method 310 prepares the packet to be communicated via the SR domain. Preparing the packet comprises including the second node identifier in the packet. In certain embodiments, preparing the packet comprises swapping a binding SID label of the packet to an SR path label stack. This may facilitate steering the packet in the SR domain core network.

At step 320, method 310 sends the packet comprising the second node identifier to the second node. In this manner, communication of the packet within the SD-WAN domain is in accordance with an SD-WAN protocol (which uses the virtual TLOC to identify the second node) and communication of the packet within the SR domain is in accordance with an SR protocol (which uses the second node identifier to identify the second node). Using the virtual TLOC in the SD-WAN to identify the second node associated with the SR domain may allow for leveraging an SD-WAN session to achieve end-to-end path selection between the SD-WAN domain and the SR domain. For example, the SD-WAN session may select the second node in the SR domain based on a policy and may identify the second node in routing messages of the SD-WAN domain based on the virtual TLOC of the second node.

Figure 4:
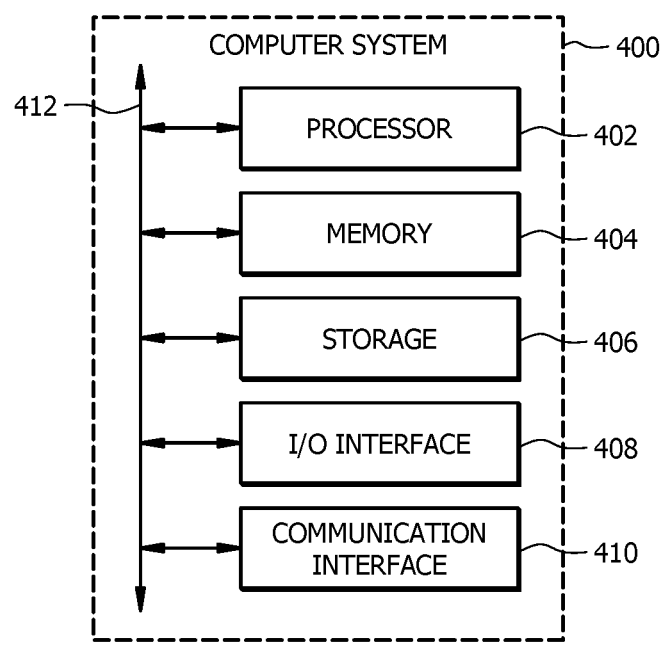
FIG. 4 illustrates an example of a computer system, in accordance with certain embodiments.

Reference is now made to FIG. 4, wherein is shown an example computer system 400 which may be used by the systems and methods described herein. In particular embodiments, one or more computer systems 400 provide functionality described or illustrated herein. As an example, one or more computer systems 400 may be used to provide at least a portion of a node 105, controller 202, or node 205 described with respect to FIGS. 1-2. As another example, one or more computer systems 400 may be used to perform one or more steps described with respect to FIG. 3. In particular embodiments, software running on one or more computer systems 400 provides functionality described or illustrated herein or performs one or more steps of one or more methods described or illustrated herein. Particular embodiments include one or more portions of one or more computer systems 400. Herein, reference to a computer system may encompass a computing device, and vice versa, where appropriate. Moreover, reference to a computer system may encompass one or more computer systems, where appropriate.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 400 may include one or more computer systems 400; be unitary or distributed; span multiple locations; span multiple machines; span multiple data centers; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example, and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include a hard disk drive (HDD), a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both, providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Additionally, although this disclosure describes or illustrates particular embodiments as providing particular advantages, particular embodiments may provide none, some, or all of these advantages.

The embodiments disclosed herein are only examples, and the scope of this disclosure is not limited to them. Particular embodiments may include all, some, or none of the components, elements, features, functions, operations, or steps of the embodiments disclosed herein.

Modifications, additions, or omissions may be made to the elements shown in the figure above. The components of a device may be integrated or separated. Moreover, the functionality of a device may be performed by more, fewer, or other components. The components within a device may be communicatively coupled in any suitable manner. Functionality described herein may be performed by one device or distributed across multiple devices. In general, systems and/or components described in this disclosure as performing certain functionality may comprise non-transitory computer readable memory storing instructions and processing circuitry operable to execute the instructions to cause the system/component to perform the described functionality.

While several embodiments have been provided in the present disclosure, it should be understood that the disclosed systems and methods might be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry configured to execute program code stored in memory. The term unit may have conventional meaning in the field of electronics, electrical devices and/or electronic devices and may include, for example, electrical and/or electronic circuitry, devices, modules, processors, receivers, transmitters, memories, logic solid state and/or discrete devices, computer programs or instructions for carrying out respective tasks, procedures, computations, outputs, and/or displaying functions, and so on, as such as those that are described herein.

What is claimed is:

1. A method performed by a node, the method comprising:
receiving a packet from a first node, the first node associated with a software-defined wide-area network (SD-WAN) domain, wherein the packet comprises a header indicating a transport locator (TLOC) associated with a second node to which to send the packet, the second node associated with a segment routing (SR) domain, wherein the first node is external to the SR domain and any other SR domain and the second node is external to the SD-WAN domain and any other SD-WAN domain;
determining that the TLOC corresponds to a virtual TLOC used in the SD-WAN domain to identify the second node associated with the SR domain, wherein the virtual TLOC indicates a System-IP, the System-IP based on a nexthop internet protocol (IP) address of a virtual private network (VPN) route associated with the second node;
in response to determining that the TLOC corresponds to the virtual TLOC, determining a second node identifier associated with the second node, the second node identifier used in the SR domain to identify the second node;
preparing the packet to be communicated via the SR domain, wherein preparing the packet comprises including the second node identifier in the packet; and
sending the packet comprising the second node identifier to the second node.

2. The method of claim 1, further comprising:
generating the virtual TLOC associated with the second node; and
publishing the virtual TLOC in the SD-WAN domain according to an overlay management protocol (OMP), wherein publishing the virtual TLOC comprises communicating the virtual TLOC to a controller associated with the SD-WAN domain, the controller configured to distribute the virtual TLOC to a plurality of nodes of the SD-WAN domain, the plurality of nodes comprising the first node.

3. The method of claim 1, further comprising:
obtaining VPN information associated with the second node;
and
distributing the VPN information and the virtual TLOC in the SD-WAN domain.

4. A node, the node comprising:
one or more processors; and
one or more computer-readable non-transitory storage media comprising instructions that, when executed by the one or more processors, cause one or more components of the node to perform operations comprising:
receiving a packet from a first node, the first node associated with a software-defined wide-area network (SD-WAN) domain, wherein the packet comprises a header indicating a transport locator (TLOC) associated with a second node to which to send the packet, the second node associated with a segment routing (SR) domain, wherein the first node is external to the SR domain and any other SR domain and the second node is external to the SD-WAN domain and any other SD-WAN domain;
determining that the TLOC corresponds to a virtual TLOC used in the SD-WAN domain to identify the second node associated with the SR domain, wherein the virtual TLOC indicates a System-IP, the System-IP based on a nexthop internet protocol (IP) address of a virtual private network (VPN) route associated with the second node;
in response to determining that the TLOC corresponds to the virtual TLOC, determining a second node identifier associated with the second node, the second node identifier used in the SR domain to identify the second node;
preparing the packet to be communicated via the SR domain, wherein preparing the packet comprises including the second node identifier in the packet; and
sending the packet comprising the second node identifier to the second node.

5. The node of claim 4, the operations further comprising:
generating the virtual TLOC associated with the second node; and
publishing the virtual TLOC in the SD-WAN domain.

6. The node of claim 5, wherein publishing the virtual TLOC in the SD-WAN domain comprises communicating the virtual TLOC to a controller associated with the SD-WAN domain, the controller configured to distribute the virtual TLOC to a plurality of nodes of the SD-WAN domain, the plurality of nodes comprising the first node.

7. The node of claim 5, wherein publishing the virtual TLOC in the SD-WAN is according to an overlay management protocol (OMP).

8. The node of claim 4, the operations further comprising:
obtaining VPN information associated with the second node;
and
distributing the VPN information and the virtual TLOC in the SD-WAN domain.

9. The node of claim 8, wherein the VPN information is obtained from the SR domain according to a border gateway protocol (BGP).

10. The node of claim 8, wherein the second node identifier used in the SR domain to identify the second node comprises the VPN information.

11. The node of claim 4, wherein preparing the packet to be communicated via the SR domain comprises swapping a binding segment identifier (SID) label of the packet to an SR path label stack.

12. The node of claim 4, wherein the virtual TLOC facilitates end-to-end control of the packet from the SD-WAN domain to the SR domain.

13. The node of claim 4, wherein the virtual TLOC further indicates a transport color and an encapsulation type.

14. One or more computer-readable non-transitory storage media embodying instructions that, when executed by a processor of a node, cause the performance of operations comprising:

receiving a packet from a first node, the first node associated with a software-defined wide-area network (SD-WAN) domain, wherein the packet comprises a header indicating a transport locator (TLOC) associated with a second node to which to send the packet, the second node associated with a segment routing (SR) domain, wherein the first node is external to the SR domain and any other SR domain and the second node is external to the SD-WAN domain and any other SD-WAN domain;

determining that the TLOC corresponds to a virtual TLOC used in the SD-WAN domain to identify the second node associated with the SR domain, wherein the virtual TLOC indicates a System-IP, the System-IP based on a nexthop internet protocol (IP) address of a virtual private network (VPN) route associated with the second node;

in response to determining that the TLOC corresponds to the virtual TLOC, determining a second node identifier associated with the second node, the second node identifier used in the SR domain to identify the second node;

preparing the packet to be communicated via the SR domain, wherein preparing the packet comprises including the second node identifier in the packet; and sending the packet comprising the second node identifier to the second node.

15. The one or more computer-readable non-transitory storage media of claim 14, the operations further comprising:

generating the virtual TLOC associated with the second node; and publishing the virtual TLOC in the SD-WAN domain according to an overlay management protocol (OMP), wherein publishing the virtual TLOC comprises communicating the virtual TLOC to a controller associated with the SD-WAN domain, the controller configured to distribute the virtual TLOC to a plurality of nodes of the SD-WAN domain, the plurality of nodes comprising the first node.

16. The one or more computer-readable non-transitory storage media of claim 14, the operations further comprising:

obtaining VPN information associated with the second node, the VPN information obtained from the SR domain according to a border gateway protocol (BGP); and distributing the VPN information and the virtual TLOC in the SD-WAN domain.

* * * * *